US009003182B2

(12) United States Patent
Davis et al.

(10) Patent No.: US 9,003,182 B2
(45) Date of Patent: Apr. 7, 2015

(54) COMMUNICATION SYSTEM AND METHOD FOR SECURELY COMMUNICATING A MESSAGE BETWEEN CORRESPONDENTS THROUGH AN INTERMEDIARY TERMINAL

(75) Inventors: Walter Lee Davis, Arlington, WA (US); Douglas I. Ayerst, Delray Beach, FL (US); Scott Alexander Vanstone, Campbellville (CA)

(73) Assignees: Certicom Corp. (CA); Motorola, Inc., Boynton Beach, FL (US)

( * ) Notice: Subject to any disclaimer, the term of this patent is extended or adjusted under 35 U.S.C. 154(b) by 72 days.

(21) Appl. No.: 13/549,176

(22) Filed: Jul. 13, 2012

(65) Prior Publication Data

US 2012/0284509 A1    Nov. 8, 2012

Related U.S. Application Data

(63) Continuation of application No. 12/848,745, filed on Aug. 2, 2010, which is a continuation of application No. 11/483,176, filed on Jul. 10, 2006, now abandoned, which is a continuation of application No. 09/680,501, filed on Oct. 5, 2000, now abandoned.

(51) Int. Cl.
  *H04L 29/06* (2006.01)
  *H04L 9/32* (2006.01)

(52) U.S. Cl.
  CPC .............. *H04L 9/3247* (2013.01); *H04L 9/321* (2013.01); *H04L 9/3263* (2013.01); *H04L 2209/56* (2013.01); *H04L 2209/80* (2013.01)

(58) Field of Classification Search
  CPC ................................ G06F 21/645; G06F 21/64

USPC .................................................. 713/156–160
See application file for complete search history.

(56) References Cited

U.S. PATENT DOCUMENTS

| | | | |
|---|---|---|---|
| 5,136,647 | A | 8/1992 | Haber et al. |
| 5,241,599 | A | 8/1993 | Bellovin et al. |
| 5,604,801 | A | 2/1997 | Dolan et al. |
| 5,649,118 | A | 7/1997 | Carlisle et al. |
| 5,748,735 | A | 5/1998 | Ganesan |
| 5,850,444 | A | 12/1998 | Rune |
| 5,870,475 | A | 2/1999 | Allan et al. |

(Continued)

FOREIGN PATENT DOCUMENTS

| | | |
|---|---|---|
| EP | 0942568 A2 | 9/1999 |
| WO | WO-0230038 A2 | 4/2002 |
| WO | WO-0230038 A3 | 4/2002 |

OTHER PUBLICATIONS

Molva et al., An authentication protocol for mobile users, Security and Cryptography Applications to Radio Systems, IEE Colloquium on Publication Year: 1994 , pp. 4/1-4/7.*

(Continued)

*Primary Examiner* — Christopher Brown
*Assistant Examiner* — Roderick Tolentino
(74) *Attorney, Agent, or Firm* — Schwegman Lundberg & Woessner, P.A.

(57) ABSTRACT

A wireless communication system includes a pager or similar device that communicates to a home terminal. The home terminal confirms the identity of the pager and attaches a certificate to the message for ongoing transmission. Where the recipient is also a pager, an associated home terminal verifies the transmission and forwards it in a trusted manner without the certificate to the recipient.

17 Claims, 4 Drawing Sheets

(56) References Cited

U.S. PATENT DOCUMENTS

| | | | |
|---|---|---|---|
| 5,878,138 A * | 3/1999 | Yacobi | 705/69 |
| 5,883,810 A | 3/1999 | Franklin et al. | |
| 5,903,882 A | 5/1999 | Asay et al. | |
| 5,943,426 A | 8/1999 | Frith et al. | |
| 6,009,173 A | 12/1999 | Sumner | |
| 6,178,507 B1 | 1/2001 | Vanstone | |
| 6,301,660 B1 * | 10/2001 | Benson | 713/165 |
| 6,370,249 B1 | 4/2002 | Van Oorschot | |
| 6,480,710 B1 | 11/2002 | Laybourn et al. | |
| 6,601,171 B1 | 7/2003 | Carter et al. | |
| 6,629,150 B1 * | 9/2003 | Huded | 709/247 |
| 6,732,101 B1 * | 5/2004 | Cook | 1/1 |
| 6,742,114 B1 | 5/2004 | Carter et al. | |
| 6,760,752 B1 | 7/2004 | Liu et al. | |
| 6,973,444 B1 * | 12/2005 | Blinn et al. | 705/51 |
| 6,996,710 B1 * | 2/2006 | Ellison et al. | 713/156 |
| 7,039,808 B1 * | 5/2006 | Fausse | 713/170 |
| 7,142,676 B1 * | 11/2006 | Hillier et al. | 380/278 |
| 7,324,645 B1 | 1/2008 | Juopperi et al. | |
| 7,747,240 B1 | 6/2010 | Briscoe | |
| 8,170,929 B1 * | 5/2012 | Mallon et al. | 705/29 |
| 8,332,657 B1 | 12/2012 | Eskicioglu et al. | |
| 2001/0050990 A1 * | 12/2001 | Sudia | 380/286 |
| 2007/0150740 A1 | 6/2007 | Davis et al. | |
| 2011/0010540 A1 | 1/2011 | Davis et al. | |

OTHER PUBLICATIONS

Wilhelm et al., A pessimistic approach to trust in mobile agent platforms, Internet Computing, IEEE vol. 4, Issue: 5 Publication Year: 2000, pp. 40-48.*

"European Application Serial No. 01973936.6, Decision to Refuse a EP Patent Application mailed Feb. 13, 2012", 11 pgs.

"European Application Serial No. 01973936.6, Office Action mailed Aug. 4, 2004", 5 pgs.

"European Application Serial No. 01973936.6, Office Action mailed Apr. 22, 2005", 3 pgs.

"European Application Serial No. 01973936.6, Office Action mailed Oct. 20, 2009", 5 pgs.

"European Application Serial No. 01973936.6, Summons to Attend Oral Proceedings dated Oct. 31, 2011", 4.

"European Application Serial No. 01973936.6, Written Submissions dated Jan. 3, 2012", 4.

"European Application Serial No. 10183477.8, Extended Search Report mailed Oct. 24, 2011", 7 pgs.

"European Application Serial No. 10183477.8, Response filed Jun. 22, 2012 to Extended Search Report mailed Oct. 24, 2012", 5 pgs.

"International Application Serial No. PCT/CA2001/001410, First Office Action mailed Aug. 4, 2004", 5 pgs.

"International Application Serial No. PCT/CA2001/001410, Second Office Action mailed Apr. 22, 2005", 3 pgs.

"International Application Serial No. PCT/CA2001/001410, Third Office Action mailed Oct. 20, 2009", 5 pgs.

Menezes, et al. "Handbook of Applied Cryptography", CRC Press, (1996), 22-30, 472-473, 547-549, 555-556.

Menezes, A. J, et al., "Handbook of Applied Cryptography", CRC Press XP002213149, (1996), 547-550, 570-583.

"U.S. Appl. No. 09/680,501, Appeal Brief filed Jul. 12, 2005", 16 pgs.

"U.S. Appl. No. 09/680,501, Appeal Brief filed Oct. 28, 2005", 20 pgs.

"U.S. Appl. No. 09/680,501, Final Office Action mailed Jan. 12, 2005", 10 pgs.

"U.S. Appl. No. 09/680,501, Non-Final Office Action mailed Jan. 9, 2006", 11 pgs.

"U.S. Appl. No. 09/680,501, Non-Final Office Action mailed Mar. 31, 2004", 10 pgs.

"U.S. Appl. No. 09/680,501, Response filed Sep. 30, 2004 to Non-Final Office Action mailed Mar. 31, 2004", 8 pgs.

"U.S. Appl. No. 11/483,176, Advisory Action mailed Aug. 16, 2010", 6 pgs.

"U.S. Appl. No. 11/483,176, Final Office Action mailed Feb. 2, 2010", 10 pgs.

"U.S. Appl. No. 11/483,176, Non-Final Office Action mailed Jul. 9, 2009", 12 pgs.

"U.S. Appl. No. 11/483,176, Response filed Jan. 8, 2010 to Non-Final Office Action mailed Jul. 9, 2009", 15 pgs.

"U.S. Appl. No. 11/483,176, Response filed Aug. 2, 2010 to Final Office Action mailed Feb. 2, 2010", 7 pgs.

"U.S. Appl. No. 11/483,176, Response filed Oct. 19, 2009 to Non-Final Office Action mailed Jul. 9, 2009", 9 pgs.

"U.S. Appl. No. 12/848,745, Non Final Office Action mailed Dec. 14, 2012", 11 pgs.

"Canadian Application Serial No. 2,424,897, Response filed Oct. 25, 2012 to Office Action mailed Jul. 25, 2011", 9 pgs.

"U.S. Appl. No. 12/848,745, Response filed Aug. 9, 2013 to Non Final Office Action mailed May 23, 2013", 11 pgs.

"U.S. Appl. No. 12/848,745, Non Final Office Action mailed May 23, 2013", 11 pgs.

"U.S. Appl. No. 12/848,745, Response filed Mar. 14, 2013 to Non Final Office Action mailed Dec. 14, 2012", 10 pgs.

"Canadian Application Serial No. 2,424,897, Office Action mailed Sep. 6, 2013", 2 pgs.

"Canadian Application Serial No. 2,424,897, Office Action mailed Feb. 2, 2010", 3 pgs.

"Canadian Application Serial No. 2,424,897, Response filed Feb. 28, 2014 to Office Action mailed Sep. 6, 2013", 7 pgs.

"Canadian Application Serial No. 2,424,897, Response filed Oct. 22, 2010 to Office Action mailed Feb. 10, 2010", 22 pgs.

"Canadian Application Serial No. 2,793,746, Office Action mailed Mar. 25, 2014", 2 pgs.

"European Application Serial No. 01973936.6, Response filed Feb. 4, 2005 to Office Action mailed Aug. 4, 2004", 7 pgs.

"European Application Serial No. 01973936.6, Response filed Apr. 23, 2010 to Office Action mailed", 24 pgs.

"European Application Serial No. 01973936.6, Response filed Oct. 24, 2005 to Office Action mailed Apr. 22, 2005", 5 pgs.

"International Application Serial No. PCT/CA2001/001410, International Search Report mailed Oct. 2, 2002", 3 pgs.

"U.S. Appl. No. 12/848,745, Final Office Action mailed Nov. 4, 2013", 12 pgs.

"U.S. Appl. No. 12/848,745, Final Office Action mailed Apr. 25, 2012", 11 pgs.

"U.S. Appl. No. 12/848,745, Non Final Office Action mailed Sep. 9, 2011", 9 pgs.

"U.S. Appl. No. 12/848,745, Response filed Feb. 8, 2012 to Non Final Office Action mailed Sep. 9, 2011", 10 pgs.

"U.S. Appl. No. 12/848,745, Response filed Jun. 7, 2012 to Final Office Action mailed Apr. 25, 2012", 8 pgs.

"Canadian Application Serial No. 2,424,897, Office Action mailed Jul. 25, 2011", 2 pgs.

"Canadian Application Serial No. 2,424,897, Response filed May 20, 2011 to Non Final Office Action mailed Nov. 30, 2010", 4 pgs.

"Canadian Application Serial No. 2424897, Office Action mailed Nov. 30, 2010", 2 pgs.

* cited by examiner

COMMUNICATION SYSTEM AND METHOD FOR SECURELY COMMUNICATING A MESSAGE BETWEEN CORRESPONDENTS THROUGH AN INTERMEDIARY TERMINAL

CROSS REFERENCE TO RELATED APPLICATIONS

This application is a continuation of U.S. patent application Ser. No. 12/848,745, Aug. 2, 2012, which is a continuation of U.S. patent application Ser. No. 11/483,176 filed on Jul. 10, 2006, now abandoned, which is a continuation of U.S. patent application Ser. No. 09/680,501 filed on Oct. 5, 2000, now abandoned, all incorporated herein by reference.

FIELD OF THE INVENTION

The present invention relates generally to cryptographic schemes, and specifically to cryptographic schemes relating to wireless applications.

BACKGROUND OF THE INVENTION

Information security is required to secure many types of transactions performed electronically using a wide range of computing and communication technologies. As consumers demand more flexible, convenient services, technologies such as wireless networks, paging infrastructures and smart cards are being deployed to support critical, information sensitive applications including account inquiries, electronic cash, secure communications and access control. One of the key features of each of these technologies is that they offer consumers the convenience of service anywhere, any time. The convenience offered to consumers results in a challenge for the vendors to create smaller and faster devices while providing a high level of security for information computed and transmitted.

Information security is provided through the application of cryptographic systems (commonly referred to as cryptosystems). The two main classes of cryptosystems are symmetric and public key. In a symmetric cryptosystem, two users wishing to participate in a secure transaction must share a common key. Therefore, each user must trust the other not to divulge the key to a third party. Users participating in a secure transaction using public key cryptosystems will each have two keys, known as a key pair. One of the keys is kept secret and is referred to as the private key, while the other can be published and is referred to as the public key. Typically, applications use a combination of both these classes of cryptosystems to provide information security. Symmetric technologies are typically used to perform bulk data encryption, while public key technologies are commonly used to perform key agreement, key transport, digital signatures and encryption of small messages.

Since the introduction of public key cryptosystems, there have been many implementations proposed. All of these public key systems are based on mathematical problems which are known to be hard, that is, it is thought that breaking a system is equivalent to solving a hard mathematical problem. These problems are generally easy to solve for numbers that are small in size, but become increasingly difficult as larger numbers are used. One of the differences among the systems is how large the numbers have to be so that the system is too hard to solve given present and anticipated computing power. This is typically linked to the length of the key and referred to as the key size. A system using a small key size while maintaining a high level of security is considered better, as it requires less information to be transmitted and stored.

Diffie-Hellman key agreement provided the first practical solution to the key distribution problem by allowing two parties to securely establish a shared secret over an open channel. The original key agreement protocol provides unauthenticated key agreement. The security is based on the discrete logarithm problem of finding integer x given a group generator a, and an element $\beta$, such that $a^x = \beta$.

Rivest Shamir Adleman (RSA) was the first widely deployed realization of a public key system. The RSA system is a full public key cryptosystem and can be used to implement both encryption and digital signature functions. The security of the RSA cryptosystem depends on the difficulty of factoring the product of two large distinct prime numbers. To create a private key/public key pair, a user chooses two large distinct primes P and Q, and forms the product n=PQ. With knowledge of P and Q, the user finds two values e and d such that $((MY^e)^d \bmod n = M$.

The public key of the user is the pair (e, n) while the private key is d. It is known that the recovery of d from and e and n requires the recovery of P and Q, and thus is equivalent to factoring n.

Elliptic curve cryptosystems are based on an exceptionally difficult mathematical problem. Thus, elliptic curve systems can maintain security equivalent to many other systems while using much smaller public keys. The smaller key size has significant benefits in terms of the amount of information that must be exchanged between users, the time required for that exchange, the amount of information that must be stored for digital signature transactions, and the size and energy consumption of the hardware or software used to implement the system. The basis for the security of the elliptic curve cryptosystem is the assumed intractability of the elliptic curve discrete logarithm problem. The problem requires an efficient method to find an integer k given an elliptic curve over a finite field, a point P on the curve, another point Q such that Q=kP.

In this system, the public key is a point (Q) on an elliptic curve (represented as a pair of field elements) and the private key is an integer (k). Elliptic curves are defined over an underlying field and may be implemented over the multiplicative group $F_p$, (the integers modulo a prime p) or characteristic 2 finite fields ($F_{2^m}$, where m is a positive integer).

There are typically three levels in a cryptosystem, which are encryption, signatures, and certificates. These three levels can be implemented using the above mentioned systems or a combination thereof.

The first level of a cryptosystem involves encrypting a message between correspondent A and correspondent B. This level is vulnerable to attack since there is no way for correspondent A to verify whether or not correspondent B sent the message, or if a third party in the guise of correspondent B sent the message.

Therefore, the second level of signing a message was introduced. Correspondent B can sign the encrypted message using, for example, a hashing function to hash the original message. If correspondent A uses the same hashing function on the decrypted message and it matches the signature sent by correspondent B, then the signature is verified. However, a third party may act as an interloper. The third party could present itself to correspondent A as if it were correspondent B and vice versa. As a result, both correspondents would unwittingly divulge their information to the third party. Therefore, the signature verifies that the message sent by a correspondent is sent from that correspondent, but it does not verify the identity of the correspondent.

To prevent this type of attack, the correspondents may use a trusted third party (TTP) to certify the public key of each correspondent. The TTP has a private signing algorithm and a verification algorithm assumed to be known by all entities. The TTP carefully verifies the identity of each correspondent, and signs a message consisting of an identifier and the correspondent's public key. This is a simple example as to how a TTP can be used to verify the identification of the correspondent.

Some of the most significant emerging areas for public key cryptosystems include wireless devices. Wireless devices, including cellular telephones, two-way pagers, wireless modems, and contactless smart cards, are increasing in popularity because of the convenience they provide while maintaining a low cost and small form factor.

However, implementing the above mentioned cryptosystems requires computational power, which is limited on such wireless devices. Therefore, there is a need for a cryptosystem that provides all of the advantages as described above, but requires less power from the wireless device.

SUMMARY OF THE INVENTION

In accordance with the present invention there is provided a method of communicating between a pair of correspondents through an intermediary comprising the steps, registering one of said correspondents with said intermediary to share an identifier, preparing at said one correspondent a secure communication including a message between said correspondents, preparing a signature component including a derivation of said secure communication and said identifier forwarding said signature component to said intermediary and verifying said signature component at said intermediary, attaching to said communication a certificate of the public key and identity of the said one correspondent, and forwarding said communication and certificate to said other correspondent.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1:
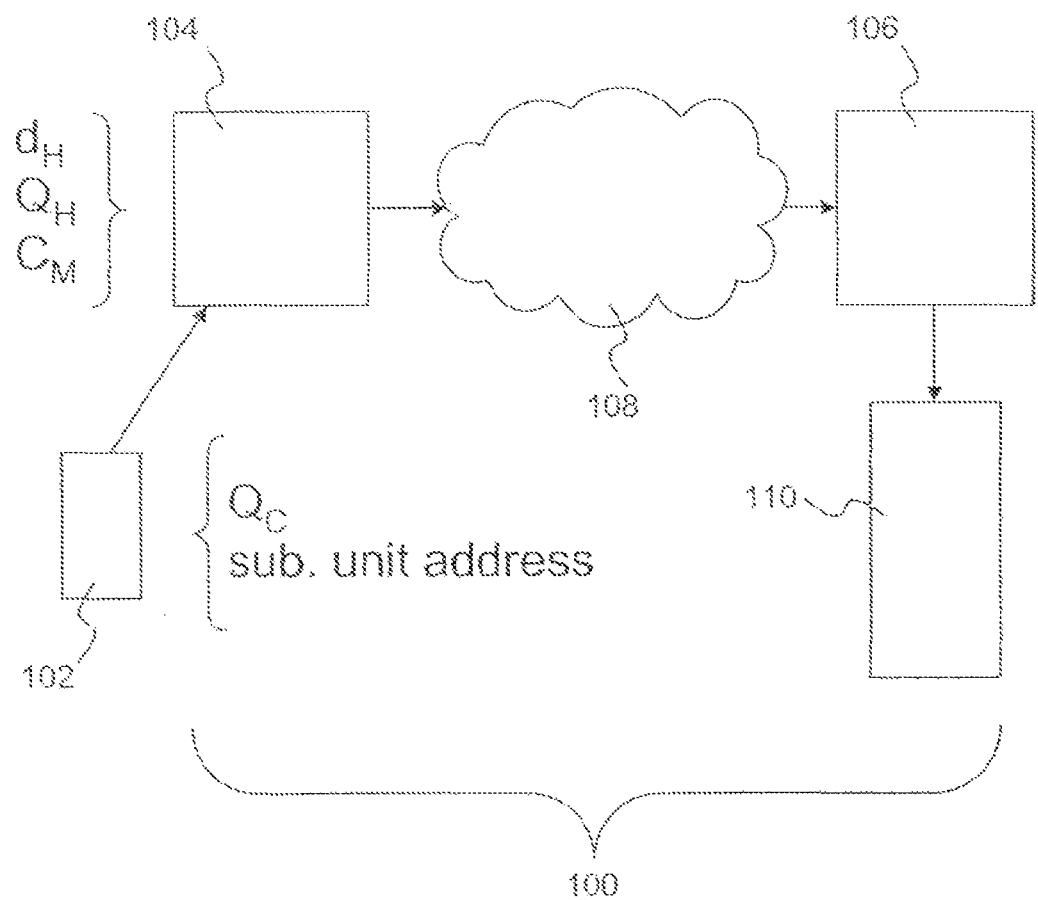
FIG. 1 is a schematic drawing of a pager system.
Figure 2:
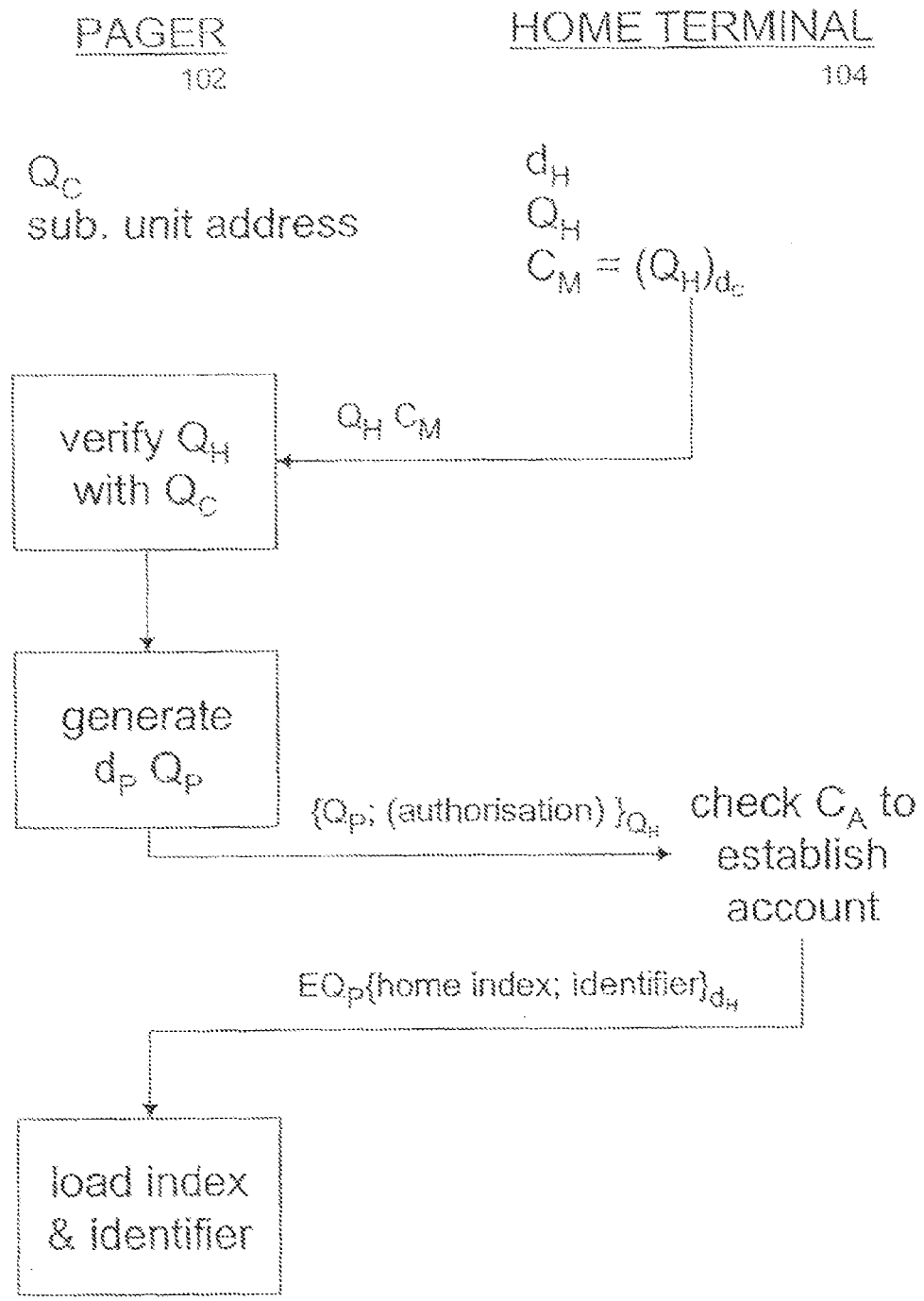
FIG. 2 is a representation of a registration process for the system of FIG. 1

For convenience, like numerals in the description refer to like structures in the drawings. Further, although the description refers only to pagers, it is intended that the description includes wireless devices in general.

Referring to FIG. 1, a paging system is represented generally by the numeral 100. A first pager 102 is operatively coupled with a first home terminal 104 through a wireless communication. The first home terminal 104 is operatively coupled to a second home terminal 106 via a network 108 and the second home terminal 106 in turn is operatively coupled to a second pager 110. The pagers 102, 110 are typically coupled to their respective home terminals 104, 106 by radio frequency. The network 108 is typically a public switched telephone network (PSTN), but can include a data network, and the Internet.

Before a pager 102 can communicate with the home terminal 104 it must be registered. Every pager 102 contains a subscriber unit address and a public key $Q_c$ of the pager manufacturer or service provider (herein referred to as the company public key). This information is loaded at the manufacture stage. The company public key $Q_c$ is derived from a company private key $d_c$.

Each home terminal 104 has a private key $d_H$ and a public key $Q_H$. The public key $Q_H$ is signed by the company private key $d_c$ to create a certificate denoted $C_M$. The company public key $Q_c$ could be system wide or defined for a given region. A subscriber purchases a pager 102 from a retail outlet and the pager is then loaded with a home index and identifier ID using the protocol outlined below. The home index is typically a 32-bit index which uniquely identifies the pager 102 and correlates it with a specific home terminal 104.

The subscriber calls a number, typically a toll-free number, to contact a service provider and a home terminal 104 is assigned. The home terminal 104 sends the pager 102 its public key $Q_H$ and its certificate $C_M$ The pager verifies $Q_H$ with the company public key $Q_c$. The pager generates a private key $d_p$ and a corresponding public key $Q_p$ which is communicated to the home terminal 104. The pager 102 sends to the home terminal 104 the necessary authorization information (including identification, credit card number, subscriber unit address, and the like) encrypted under the home terminal public key $Q_H$). The home terminal gets authorization from a central repository that this subscriber unit has not already been activated and thereby prevents counterfeiting of subscriber units. The home terminal 104 sets up a subscriber account and sends the pager 102 its home index and identifier ID encrypted under $Q_p$ and signed by the home terminal.

Each pager 102 in a paging infrastructure 100 is registered with a home terminal using the registration protocol described above. The pagers have a private and public key pair, $dp, Q_p$, each of which are approximately 20 bytes in length. The home terminals 104 have a private and public key pair dh, $Q_H$ each of which are approximately 25 bytes in length. It is desirable to have a longer key length at the home terminal for providing additional security. Further, since the home terminal 104 does not have the same power constraints as the pager 102, the extra computational power required for the longer key is not a significant issue. The additional security at the home terminal 102 is important since a compromise of the home terminal would permit counterfeiting of subscriber units.

To reduce the computational requirements on the pager thereby reducing the power required to encrypt a message M, each of the pagers 102 has a certificate registered for it at the home terminal 104. The certificate, $cert_{ca>}$, validates the public key $Q_p$, and identity ID. Each of the home terminals maintains a table for the pagers and their associated certificate. Rather than having the pager sign the certificate and send the message to the home terminal, the certificate $cert_{ca>}$ is signed by the pager's home terminal. The transmission process used to implement such a protocol is described in detail below.

Figure 3:
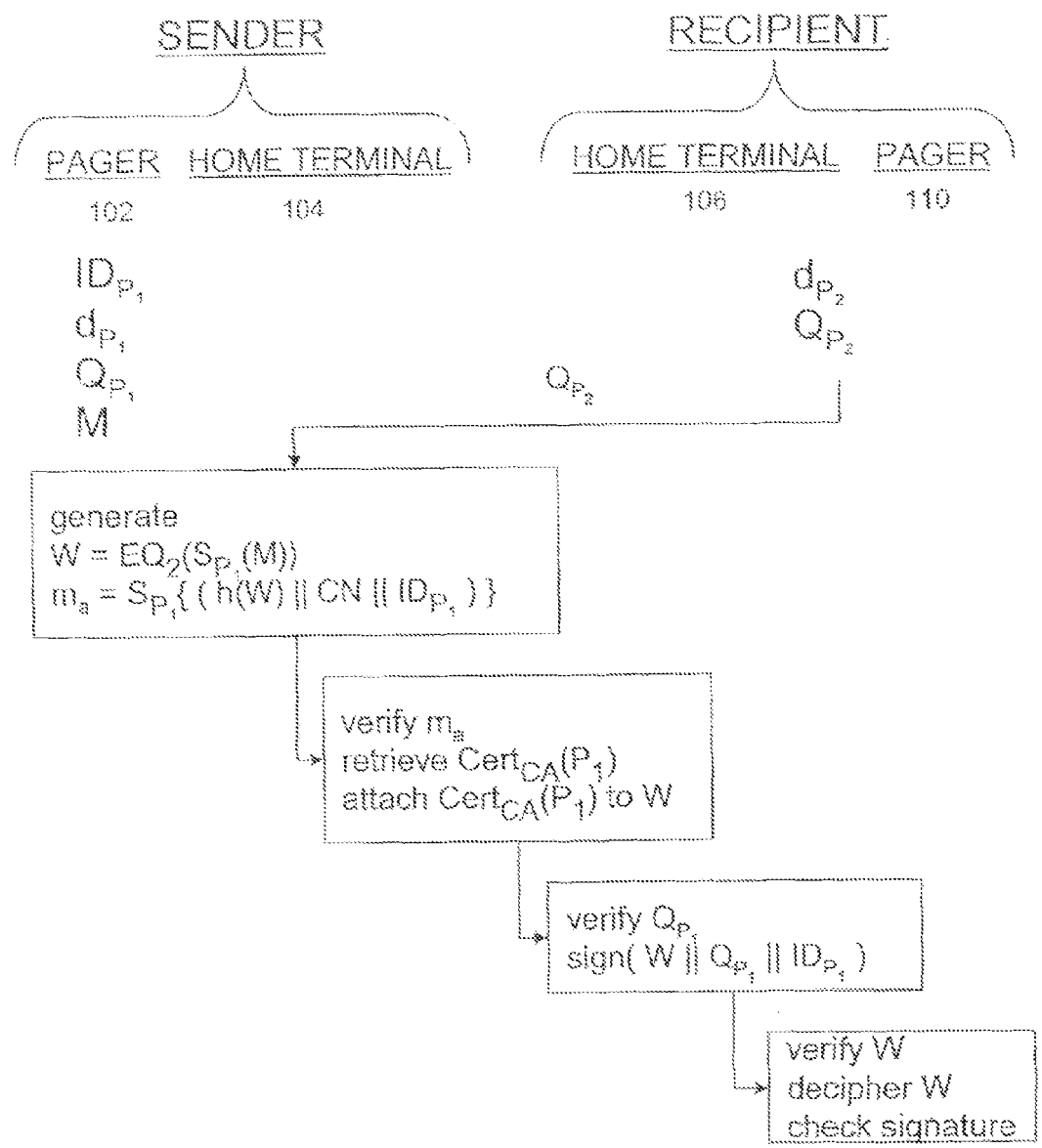
FIG. 3 is a representation of a message transfer system for the system of FIG. 1

Referring once again to FIG. 1 and FIG. 3, the first pager $P_1$ wishes to send a message M to a recipient, e.g. a second pager $P_2$ having a public key $Qp_2$. The sender $P_1$ initially obtains an authentic copy of a recipient's public key $Q p_2$. The first pager $P_1$ calculates ciphertext with of a signed message M such that $W = EQp_2, (Sp_1, (M))$, where $EQp_2$ is encryption under the public key $Qp_2$ and $Sp_1$ is the signature of the first pager on message M using the private key dp.

The first pager also calculates a signature $m_a = Sp_1 (h(w) \% CN \% IDp_1,)$ where h(w) is a hash of W, such as SHA-1. CN is a timestamp or some other nonce, $IDp_1$, is the unique identifier of the first pager, and % represents concatenation. The first pager then transmits the signature, $m_a$ and the signed, encrypted message, W, to the first home terminal.

The signature, ma, is used by the home terminal 104 associated with pager $P_1$ to verify that $P_1$ is a legitimate user. In order to avoid a challenge-response authentication to save time and bandwidth, the message W and a nonce CN, which is unique for each transmission, are coupled with the ID of $P_1$ and signed. The nonce is used to prevent replay of the transmission. W is a signed, encrypted form of the message M. Signing then encrypting is preferred over encrypting then signing.

The first home terminal receives ma and W from $P_1$ and uses $M_a$ to verify that $P_1$ is a legitimate user. $IDp_1$, is recovered from ma, and the first home terminal retrieves the certificate, $Cert_{ca}$ for $P_1$ from the corresponding table and attaches it to W. $Cert_{ca}$ is a full certificate such as X.509 and consists of 1 bytes. There is no loss of security in storing the $Cert_{ca}$ certificates at the first home terminal.

In addition to saving computational power on the pager, the bandwidth requirements of the transmission from the pager to the base are reduced since the pager does not have to transmit a certificate.

The first home terminal 104 stores a pre-computed table of values which allows it to increase the speed of verifying $P_1$'s signature. Alternately, if verification is fast enough, as would be the case with a hardware implementation, the table of values is not required.

The first home terminal then removes the signature component $M_a$ and transmits the signed, encrypted message W and the certificate $Cert_{ca}$ to the recipient. Since the recipient in this example is the second pager 110, W and $Cert_{ca}$ are sent to the second home terminal 106 that has public and private keys $Q_{p3}$ $d_{p3}$ respectively.

The second home terminal, 106 receives the transmission and verifies $Qp_1$ using $Cert_{ca}(Qp_1, IDp_1)$. To save bandwidth, the second home terminal 106 signs $Qp_1$, according to the signature function $S_{dp3} (W \% Qp_1 \% ID_{p3})$ and sends it along with W to $P_2$. A time stamp $CN_1$ may be included to prevent replay attacks. $P_2$ trusts the second home terminal to do this honestly. The pager $P_2$ can then verify W and recover the message M using its private key $d_{p2}$ and the senders public key $Q_{p1}$. $Q_{p1}$ has been validated by the signature of the home terminal 104 and therefore communicating between the second home terminal 106 and the second pager 110 in this manner keeps the certificates off the transmission channel and reduces bandwidth requirements.

An example of the bandwidth requirements for such a method is described as follows. Suppose M consists of t bytes. If the Nyberg-Rueppel protocol is used for signing the message, t+20 bytes are required for $Sp_1(M)$. A further 20 bytes are used to encrypt $Sp_1(M)$, therefore W is t+40 bytes in length. Hashing h(W) uses 20 bytes if SHA-1 is used. The nonce CN uses 4 bytes and the identification $IDp_1$ uses 4 bytes. Once again, if Nyberg-Rueppel is used for signing, 20 additional bytes are used. Hence $m_a$ will be 48 bytes. Therefore, the transmission between the first pager and the first home terminal uses t+92 bytes.

For the transmission from the first home terminal to the second home terminal, W uses t+40 bytes, $Cert_{ca}$ uses l bytes, and therefore the bandwidth required is t+l+40 bytes.

For the transmission from the second home terminal, W uses t+40 bytes, $Qp_1$ uses 20 bytes, $1Dp_1$ uses 4 bytes, and $CN_1$ uses 4 bytes. Therefore, using Nyberg-Rueppel for signing, the bandwidth used in sending W and $S_{dp3}(W \% Qp_1 \% (IDp_1,)$ and the nonce $CN_1$ is a total of 25+(t+40)+20+4+4=t+93 bytes.

Figure 4:
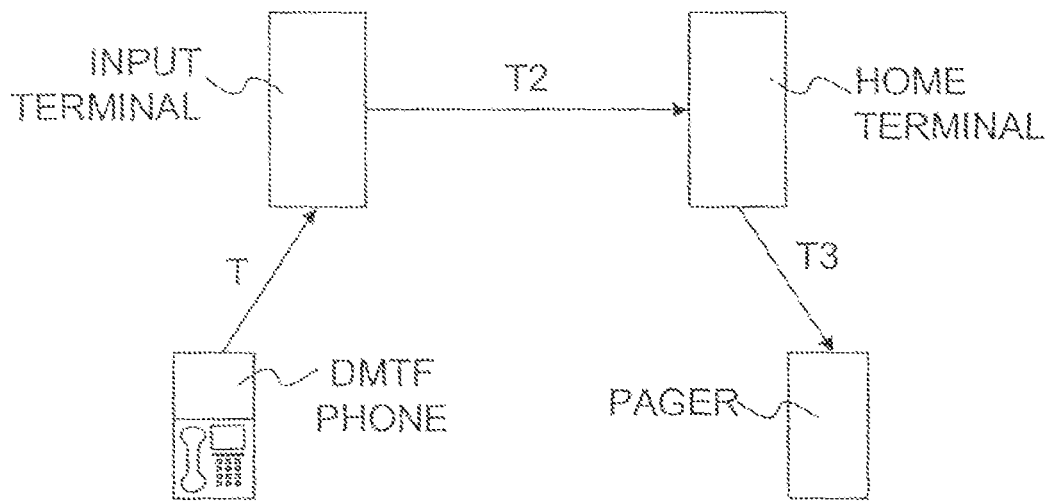
FIG. 4 is a schematic representation of an alternative embodiment of a communication system.

In the above example, the transmission is from pager to pager. However, the protocol may be used from the input devices, for example, a DTMF telephone as illustrated in FIG. 4. In this case, the transmission T, would be W and $Cert_{ca}$ $(Qd.^{ID}_D)$ where $Q_D$ and $ID_D$ are the public key and identity of the telephone.

The transmission T2 would be W and $cert_{ca} (Qd.^{ID}_D)$ and the transmission T3 to the pager, after verification of $Cert_{ca}$ would be $Q_D$, With $1D_D$ and CN all signed by the home terminal.

What is claimed is:

1. A method, performed at an intermediary terminal, of communicating a message between correspondents in a communication system through the intermediary terminal, the method comprising:

registering a certificate of a public key of a first correspondent in a table in the intermediary terminal, the first correspondent being a wireless subscriber unit;

receiving from the first correspondent, subsequent to registering the certificate, a secure communication including said message, the message being a signed encrypted message comprising ciphertext encrypted under a public key of a recipient and a signature of the first correspondent on the message using a private key of the first correspondent;

receiving, along with the secure communication, a signature component comprising a hash of the signed encrypted message concatenated with a nonce and an identifier of the first correspondent, signed by the first correspondent using the private key of the first correspondent;

verifying said signature component;

recovering, when the signature component is verified, said identifier from said signature component;

retrieving the certificate of the public key of said first correspondent from the table using the recovered identifier;

signing the certificate with a private key of the intermediary terminal;

attaching to said secure communication said signed certificate; and forwarding said secure communication and said signed certificate to a second correspondent wherein registering comprises:

transferring by the intermediary terminal a public key of said intermediary terminal to said first correspondent; and receiving at the intermediary terminal from said first correspondent, said public key of said first correspondent, wherein said first correspondent has stored in memory a public key of a trusted party and said intermediary terminal has a certificate of said public key of said intermediary terminal signed by said trusted party, wherein said first correspondent is arranged to verify said public key of said intermediary terminal with said public key of said trusted party, and wherein said public key of said intermediary terminal is used by said first correspondent to sign said public key of said first correspondent for secure transfer to said intermediary terminal.

2. The method according to claim 1 wherein said nonce is unique to each communication.

3. The method according to claim 1 wherein said identifier is unique to said first correspondent and is associated with said first correspondent.

4. The method according to claim 1 wherein said second correspondent is a second intermediary terminal, which utilizes said certificate to determine the public key of said first correspondent.

5. The method according to claim 4 wherein said second intermediary terminal signs another message including said public key of said first correspondent to generate a signature of said another message, and forwards said secure communication and said signature of said another message to said recipient.

6. The method according to claim 5 wherein said recipient retrieves said public key of said first correspondent using said signature of said another message, and extracts said message from said secure communication.

7. The method according to claim 1 wherein said first correspondent forwards authorization information to said intermediary terminal during registration and said intermediary terminal verifies that said first correspondent is not prior registered with a certifying authority.

8. The method according to claim 7 wherein said authorization information includes an address particular to said first correspondent for identification by said certifying authority.

9. The method according to claim 1 wherein said identifier is transferred from said intermediary terminal to said first correspondent upon verification by a certifying authority.

10. The method according to claim 9 wherein transfer of said identifier is secured by the public key of said first correspondent and said private key of said intermediary terminal.

11. An intermediary terminal arranged for communicating a message between correspondents, the intermediary terminal comprising processing circuitry and memory arranged to:
    register a certificate of a public key of a first correspondent in a table in the intermediary terminal, the first correspondent being a wireless subscriber unit;
    receive from the first correspondent, subsequent to registering the certificate, a secure communication including said message, the message being a signed encrypted message comprising ciphertext encrypted under a public key of a recipient and a signature of the first correspondent on the message using a private key of the first correspondent;
    receive, along with the secure communication, a signature component comprising a hash of the signed encrypted message concatenated with a nonce and an identifier of the first correspondent, signed by the first correspondent using the private key of the first correspondent;
    verify said signature component;
    recover, when the signature component is verified, said identifier from said signature component;
    retrieve the certificate of the public key of said first correspondent from the table using the recovered identifier;
    sign the certificate with a private key of the intermediary terminal;
    attach to said secure communication said signed certificate; and
    forward said secure communication and said signed certificate to a second of said correspondents,
    wherein to register the certificate, the intermediary terminal is arranged to:
    transfer a public key of said intermediary terminal to said first correspondent; and
    receive from said first correspondent, said public key of said first correspondent,
    wherein said first correspondent has stored in memory a public key of a trusted party and said intermediary terminal has a certificate of said public key of said intermediary terminal signed by said trusted party,
    wherein said first correspondent is arranged to verify said public key of said intermediary terminal with said public key of said trusted party, and
    wherein said public key of said intermediary terminal is used by said first correspondent to sign said public key of said first correspondent for secure transfer to said intermediary terminal.

12. The intermediary terminal according to claim 11 wherein said a nonce is unique to each communication.

13. The intermediary terminal according to claim 11 wherein said identifier is unique to said first correspondent and is associated with said one of said correspondents.

14. The intermediary terminal according to claim 11 wherein said second correspondent is a second intermediary terminal, which utilizes said certificate to determine the public key of said first correspondent.

15. The intermediary terminal according to claim 14 wherein said second intermediary terminal is configured to sign another message including said public key of said first correspondent to generate a signature of said another message, and forward said secure communication and said signature of said another message to said recipient.

16. The intermediary terminal according to claim 15 wherein said recipient is configured to retrieve said public key of said first correspondent using said signature of said another message, and extract said message from said secure communication.

17. A non-transitory computer-readable storage medium that stores instructions for execution by one or more processors to perform operations at an intermediary terminal for communicating a message between correspondents in a communication system through the intermediary terminal, the operations comprising:
    registering a certificate of a public key of a first correspondent in a table in the intermediary terminal, the first correspondent being a wireless subscriber unit;
    receiving from the first correspondent, subsequent to registering the certificate, a secure communication including said message, the message being a signed encrypted message comprising ciphertext encrypted under a public key of a recipient and a signature of the first correspondent on the message using a private key of the first correspondent;
    receiving, along with the secure communication, a signature component comprising a hash of the signed encrypted message concatenated with a nonce and an identifier of the first correspondent, signed by the first correspondent using the private key of the first correspondent;
    verifying said signature component;
    recovering, when the signature component is verified, said identifier from said signature component;
    retrieving the certificate of the public key of said first correspondent from the table using the recovered identifier;
    signing the certificate with a private key of the intermediary terminal;
    attaching to said secure communication said signed certificate; and
    forwarding said secure communication and said signed certificate to a second correspondent, wherein registering comprises:

transferring by the intermediary terminal a public key of said intermediary terminal to said first correspondent; and receiving at the intermediary terminal from said first correspondent, said public key of said first correspondent, wherein said first correspondent has stored in memory a public key of a trusted party and said intermediary terminal has a certificate of said public key of said intermediary terminal signed by said trusted party, wherein said first correspondent is arranged to verify said public key of said intermediary terminal with said public key of said trusted party, and wherein said public key of said intermediary terminal is used by said first correspondent to sign said public key of said first correspondent for secure transfer to said intermediary terminal.

* * * * *